Oct. 17, 1967  H. H. RAMBOLD  3,347,680
METHOD OF PREPARING TURKEY PRODUCT
Filed Oct. 24, 1966  2 Sheets-Sheet 1
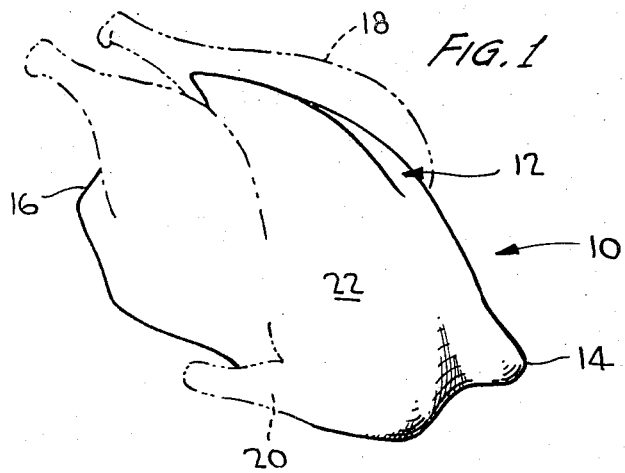
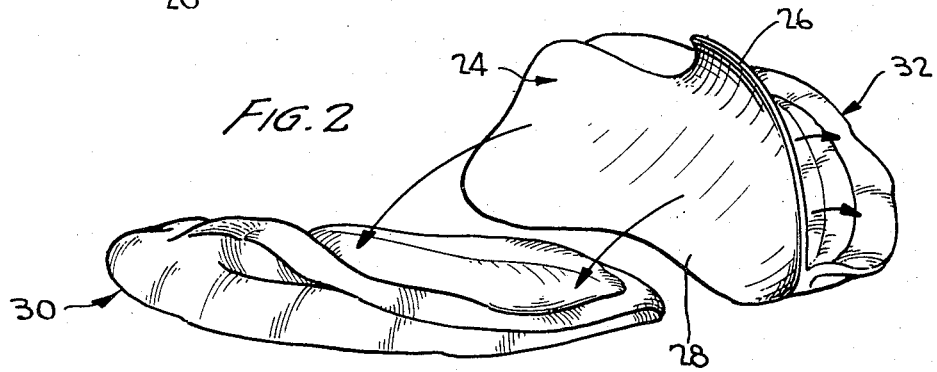
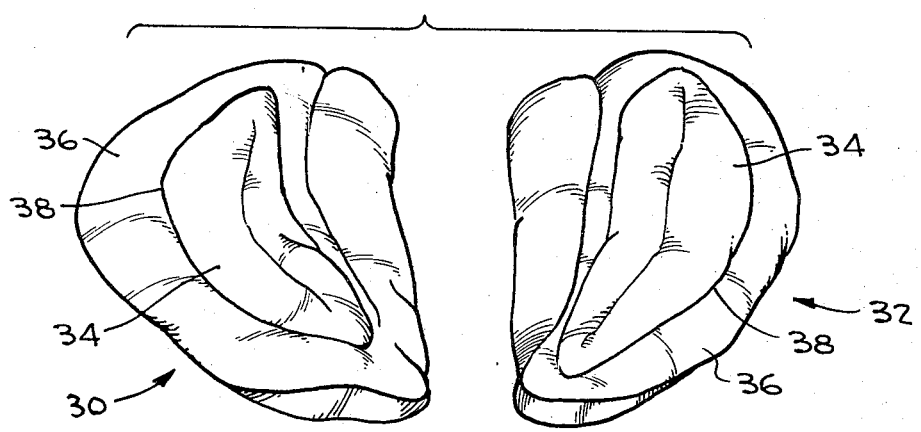
INVENTOR,
HERBERT H. RAMBOLD
BY Jacobi & Davidson
ATTORNEYS Oct. 17, 1967  H. H. RAMBOLD  3,347,680
METHOD OF PREPARING TURKEY PRODUCT
Filed Oct. 24, 1966  2 Sheets-Sheet 2
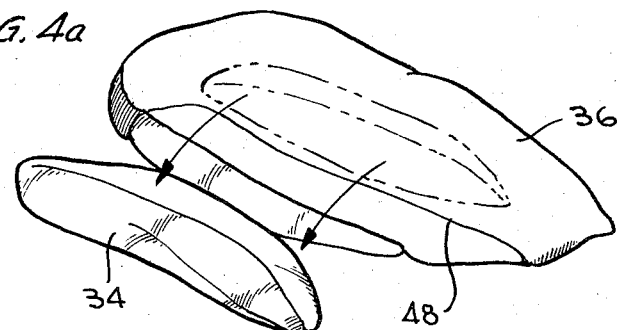
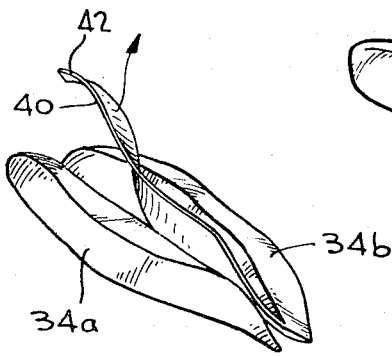
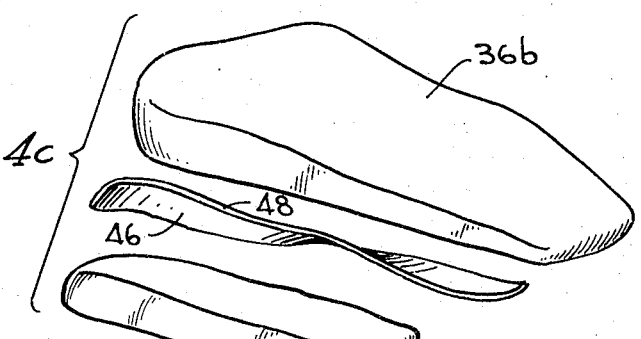
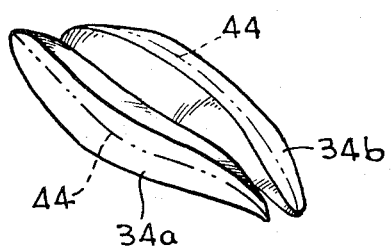
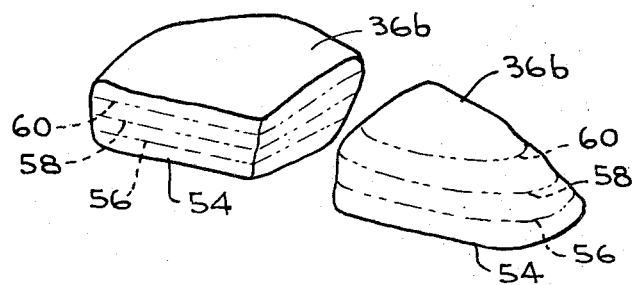
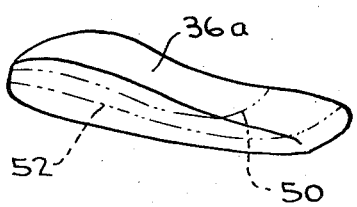
INVENTOR,
HERBERT H. RAMBOLD
BY
Jacobi & Davidson
ATTORNEYS United States Patent Office 3,347,680
Patented Oct. 17, 1967

3,347,680
METHOD OF PREPARING TURKEY PRODUCT
Herbert H. Rambold, 2105 Brandywood Drive,
Wilmington, Del. 19803
Filed Oct. 24, 1966, Ser. No. 588,995
4 Claims. (Cl. 99—107)

ABSTRACT OF THE DISCLOSURE

A method of preparing turkey or other poultry product in the form of a flat elongated slice or slices of raw fowl free from bones, tendons, membranes and skin.

This invention relates to poultry type food products and more particularly it relates to a method of carving a turkey or other fowl to produce therefrom a plurality of flat slices.

Although the present invention is directed most particularly to the formation of turkey slices, it will be understood that the principles thereof are applicable to any similar type of poultry or fowl.

The particular cut of meat known as a "cutlet" has become quite popular and is used in several different types of recipes. In the past, such cutlets have been exclusively in the form of veal cutlets which have been prepared from a leg of veal. However, a leg of veal is a rather expensive section of meat to purchase in the first instance, and moreover, it has a large amount of waste thereon. Also, it is a difficult and time-consuming job to convert a leg of veal into a plurality of veal cutlets.

In accordance with the principles of the present invention, it is, therefore, a primary object of the present invention to provide a new food product which can be best described as a poultry slice. Such a poultry slice can be cooked in the same manner, and using the same recipes, as veal cutlets.

Another object of the present invention is to provide a method for carving or otherwise preparing a turkey or other type of fowl to form a plurality of flat slices.

Another object of the present invention is to provide a process for converting a New York dressed or eviscerated turkey, or other similar fowl, into a plurality of flat elongated slices which are free from tendons, membranes and skin, which provide a highly tasty and edible food product which can be readily prepared by a variety of cooking procedures or recipes, and which is relatively inexpensive to produce.

Another object of the present invention is to provide a new and improved food product which is similar to a veal cutlet in that it can be prepared and cooked in the same manner as a veal cutlet, but which can be produced much more quickly and inexpensively than a veal cutlet can be produced from a leg of veal.

Another object of the present invention is to provide a new and improved method of carving a turkey or other fowl to create a new type of food product, such process being relatively easy and rapid, while serving to minimize the waste products and thereby decreasing the unit cost of the food product produced by such process.

Other objects, advantages and salient features of the present invention will become apparent from the following detailed description, which, taken in conjunction with the annexed drawings, discloses a preferred embodiment thereof.

Referring to the drawings:

FIGURE 1 is a perspective view of a fowl, as the same is customarily sold;

FIGURE 2 is a perspective view showing an entire breast half removed from the breast bone of the fowl;

FIGURE 3 is a top plan view of both entire breast halves as removed from the breast bone;

FIGURES 4a, 4b and 4c are diagrammatically perspective views showing the manner in which an entire breast half is processed to remove any membranes or tendons therefrom; and, FIGURES 5, 6 and 7 are perspective views illustrating the manner in which the various portions of a breast half are severed or sliced to create the desired final slices.

With continued reference to the drawings, there is shown in FIGURE 1, a turkey or other fowl or poultry product generally designated 10. The turkey 10 is conventionally provided in either eviscerated or New York dressed form. The entire underside of the turkey 10 is formed by a breast section which is generally designated 12. To understand the orientation of the turkey 10 of FIGURE 1, the anterior end thereof is designated 14 and the posterior end thereof is designated 16.

To commence processing of the turkey or fowl 10, the legs 18 and the wings 20 are removed therefrom by a suitable cutting or shearing operation. Then, the entire skin 22 is removed from the fowl 10 by peeling or slicing the same away from the underlying meat.

Thereafter, following removal of the legs, wings and skin, the fowl 10 is centrally severed medially along the breast section 12 between the anterior and posterior ends 14 and 16. As can best be seen from FIGURE 2, the fowl 10 includes a breast bone generally designated 24 having a central rib or ridge 26 and concave side portions 28 extending therefrom. The breast bone ridge 26 extends medially along the breast section 12 and the initial severing takes place axially along this ridge 26.

The severing continues with the slicing extending entirely along one side 28 of the breast bone 24 until an entire breast half, generally designated 30, is removed therefrom, in the manner shown in FIGURE 2. Then, the slicing takes place along the opposite side of the breast bone until the opposite breast half, generally designated 32, is removed therefrom.

The breast halves 30 and 32 are shown in FIGURE 3 in the form in which they are removed from the breast bone 24. Each breast half includes a filet portion 34 which was previously disposed within the concave side portion 28 of the breast bone 24. The filet portions 34 are connected with the remaining breast half portions 36 by means of a thin membrane 38 extending therebetween.

When the breast halves 30 and 32 have been removed from the breast bone 24 and have been laid on a suitable supporting surface in the manner shown in FIGURE 3, the filet portions 34 are removed from the remaining breast portions 36. As shown in FIGURE 4a, such removal is effectuated by severing of the thin membrane 38. Such severing is usually performed with the point of a sharp knife which follows the outline or periphery of the filet portion 34. When the membrane 38 is completely severed in this manner, the filet portion 34 can be removed from the remaining breast half portion 36, as shown in FIGURE 4a.

A central tendon 40 extends longitudinally of the filet portion 34, with only the edge 42 of the tendon being visible. The filet portion 34 is slit or cut open along this edge 42, as shown in FIGURE 4b, and the tendon 40 is removed therefrom. Such removal of the tendon 40 separates the filet portion 34 into two halves designated 34a and 34b. Then, as shown in FIGURE 5, each of these halves is longitudinally sliced or cut along a slice line 44 to divide the same into the desired elongated flat cutlets. If the transverse width of the halves 34a and 34b is unduly small, then the cut made along the line 44 should not extend entirely through the half and the cutlet can be formed by butterflying the filet half. However, on a large fowl, such as a turkey, the transverse width of the filet halves is usually sufficient to permit the cut 44 to extend entirely therethrough so that two cutlets are formed from each filet half and thus four cutlets are obtained from each filet portion 34.

Referring back to the remaining breast half portions 36, after the filet portions 34 have been removed therefrom, it will be seen that a tendon 46 extends longitudinally thereof with the edge 48 of the tendon being visible and serving as a dividing line along the portion 36. As shown in FIGURE 4c, the portion 36 is severed along the edge 48 to enable the tendon 46 to be removed. Such severance divides the portion 36 into a smaller section 36a and a larger section 36b. The smaller section 36a, as shown in FIGURE 7, can be sliced by parallel longitudinal slices 50 and 52 to divide the same into three separate slices. It will, of course, be appreciated that the number of spaced parallel longitudinal slices such as 50 and 52 depends upon the size of the portion 36a and the thickness of slice desired.

As for the larger portion 36b, it will be seen that the same is transversely severed in the manner shown in FIGURE 6 to divide the same into two parts, and each of these parts is then sliced by means of a series of spaced parallel longitudinal slices 54, 56, 58 and 60 to divide the parts into a plurality of flat elongated slices. As can be seen, the process described hereinabove creates a great number of suitable slices. In fact, it has been found that almost one slice can be obtained for each pound of weight of the initial fowl 10. For example, a 36 lb. turkey processed in accordance with the foregoing steps yielded 30 individual slices, each being of a length, width, thickness and weight substantially equivalent with that of a corresponding commercially available veal cutlet. Moreover, the turkey slices produced by the process of the present invention are free of tendons, membranes and skin and are extremely tender and tasty. After the individual slices have been formed, they can be flattened out further by striking them with a tenderizing hammer. This also serves to soften the slices.

After reading the foregoing detailed description, it will be apparent that the objects set forth at the outset of the specification have been successfully achieved by the present invention.

What is claimed is:
1. A method of preparing a turkey or other fowl of the type having a breast bone with a pair of breast halves disposed on opposite sides thereof, each of said breat halves including a filet portion contiguous with a side of the breast bone, to form a plurality of flat slices, said method comprising the steps of:
removing the skin from a fowl;
centrally severing the fowl medially of its breats section and axially along the center of the breast bone;
slicing along one side of the breast bone to remove one entire breast half therefrom;
slicing along the opposite side of the breast bone to remove the other entire breast half therefrom;
separating the filet portion from each entire breast half, thereby leaving two remaining breast half portions;
removing the tendons from said remaining breast half portions;
longitudinally slicing each remaining breast half portion into a plurality of flat slices; and
severing the filet portions to first remove the tendons therefrom and thereafter to form additional slices.
2. A method as defined in claim 1 further including the step of severing the legs and wings from the fowl prior to removal of the breast halves from the breast bone.
3. A method as defined in claim 2 wherein the step of severing the filet portions includes centrally slicing each filet portion to expose the central tendon therewithin and removing the exposed central tendon therefrom.
4. A method as defined in claim 2 wherein the step of removing the tendons includes splitting each remaining breast half portion along the longitudinally extending tendon line to divide the same into first and second portions with the tendon being carried by said second portion, and thereafter cutting the tendon from said second portion.

References Cited

UNITED STATES PATENTS

| 2,876,100 | 3/1959 | Rogers et al. | 99—107 |
| 3,006,766 | 10/1961 | Zolezzi et al. | 99—107 |
| 3,100,713 | 8/1963 | Grant | 99—107 X |
| 3,166,427 | 1/1965 | Herrmann | 99—107 X |

HYMAN LORD, *Primary Examiner.*